United States Patent
Neumann et al.

(10) Patent No.: US 9,438,429 B2
(45) Date of Patent: Sep. 6, 2016

(54) METHOD FOR AUTHENTICATION AND ELECTRONIC DEVICE FOR PERFORMING THE AUTHENTICATION

(75) Inventors: Heike Neumann, Hamburg (DE); Paul Hubmer, Hart-Purgstall (AT); Peter Thueringer, Graz (AT)

(73) Assignee: NXP B.V., Eindhoven (NL)

( * ) Notice: Subject to any disclaimer, the term of this patent is extended or adjusted under 35 U.S.C. 154(b) by 1402 days.

(21) Appl. No.: 12/601,263

(22) PCT Filed: Apr. 28, 2008

(86) PCT No.: PCT/IB2008/051635
§ 371 (c)(1),
(2), (4) Date: Nov. 22, 2009

(87) PCT Pub. No.: WO2008/152533
PCT Pub. Date: Dec. 18, 2008

(65) Prior Publication Data
US 2010/0158246 A1    Jun. 24, 2010

(30) Foreign Application Priority Data

Jun. 11, 2007  (EP) .................................... 07109974

(51) Int. Cl.
*G06F 21/00* (2013.01)
*H04L 9/32* (2006.01)
*H04L 9/08* (2006.01)
(Continued)

(52) U.S. Cl.
CPC ........... *H04L 9/3273* (2013.01); *G06F 21/445* (2013.01); *H04L 9/0838* (2013.01); *H04L 63/0869* (2013.01); *H04L 63/061* (2013.01)

(58) Field of Classification Search
CPC ... H04L 63/06; H04L 63/061; H04L 63/062; H04L 63/08; H04L 9/0838; H04L 9/0844
USPC ............ 726/34; 713/168–171; 380/255, 259, 380/260, 270, 277, 283, 44, 30
See application file for complete search history.

(56) References Cited

U.S. PATENT DOCUMENTS

| | | |
|---|---|---|
| 6,094,485 A | 7/2000 | Weinstein |
| 6,915,426 B1 | 7/2005 | Carman et al. |
| 6,980,659 B1 * | 12/2005 | Elliott ........................... 380/277 |

(Continued)

FOREIGN PATENT DOCUMENTS

| | | |
|---|---|---|
| CN | 1534935 A | 10/2004 |
| CN | 1725852 A | 1/2006 |

(Continued)

OTHER PUBLICATIONS

"Part 2: Internet VPN wo jitsugen suru security protocol" [Part 2: A security protocol which implements Internet VPN], Network World, IDG Japan. Inc, Mar. 1, 2003, vol. 8, No. 3, pp. 41 to 50.

(Continued)

*Primary Examiner* — Edward Zee

(57) ABSTRACT

An authentication method (100) for a secure data transmission is provided, the method comprising performing a first authentication protocol (101) by using a first cipher and performing a second authentication protocol (102) by using a second cipher. Possible inputs for the first authentication protocol (101) may be one shared key or several keys, and one or two random numbers.

17 Claims, 2 Drawing Sheets

(51) Int. Cl.
*G06F 21/44* (2013.01)
*H04L 29/06* (2006.01)

(56) References Cited

U.S. PATENT DOCUMENTS

| | | |
|---|---|---|
| 2002/0059518 A1 | 5/2002 | Smeets |
| 2002/0066018 A1* | 5/2002 | Linnartz ................. 713/171 |
| 2003/0079143 A1* | 4/2003 | Mikel et al. ............. 713/200 |
| 2004/0077335 A1* | 4/2004 | Lee et al. ................ 455/410 |
| 2005/0216736 A1 | 9/2005 | Smith et al. |

FOREIGN PATENT DOCUMENTS

| | | |
|---|---|---|
| CN | 1874222 A | 12/2006 |
| EP | 1 094 682 A1 | 4/2001 |
| JP | 2003-037587 A | 2/2003 |
| JP | 2005-327315 A | 11/2005 |
| JP | 2006-020262 A | 1/2006 |
| JP | 2006-185315 A | 7/2006 |
| JP | 2007-027847 | 2/2007 |
| WO | 2006/120617 A | 11/2006 |
| WO | WO 2006/120617 | * 11/2006 |

OTHER PUBLICATIONS

Masaaki Matsushima, "IP sec-no-Kihon-to Remote Access-heno Oyo"[Fundamentals of IPsec and Its Application to Remote Access], a presentation material for Internet Week 2003, pp. 16 to 30, [online], Dec. 2003, [Retrieved on Jun. 1, 2015], Internet URL: https://www.nic.ad.jp/ja/materials/iw/2003/proceedings/T10-1.pdf.
Office Action for Counterpart JP patent application 2010-510919 English translation (Jun. 16, 2015).
Office Action for Counterpart JP patent application 2010-510919 English translation (Nov. 11, 2014).

* cited by examiner

METHOD FOR AUTHENTICATION AND ELECTRONIC DEVICE FOR PERFORMING THE AUTHENTICATION

FIELD OF THE INVENTION

The invention relates to method of authentication.

The invention further relates to a method for secure data transmission.

Further, the invention relates to an electronic device for performing an authentication.

In addition, the invention relates to a method of generating session keys for an encrypted communication.

Moreover, the invention relates to a program element.

Furthermore, the invention relates to a computer-readable medium.

BACKGROUND OF THE INVENTION

For many applications such as electronic ticketing, transport or digital access control systems security tokens are used to store relevant or security information. Typically, this information has to be protected with respect to confidentiality, authenticity and integrity. This protection does not only have to be maintained while the data is stored in the security token but also when transmitted to the back office system that processes the data after reading it out. In order to implement secure communication between a security token and a reader device, the two entities perform a mutual authentication from which session keys are derived that can be used for subsequent secure messaging between the communication partners.

A typical requirement for the beginning of secure messaging is that the communication partners perform a handshake protocol, which is often part of the mutual authentication protocol. A reason for mandating a handshake protocol is that the communication partners ensure that the authentication actually succeeded and that the key they agreed upon is indeed known by both parties.

Security tokens as used today, often use high performance authentication protocols or mechanisms which have a medium or even low security level.

OBJECT AND SUMMARY OF THE INVENTION

It may be an object of the present invention to provide an alternative method of authentication and an electronic device for performing an authentication.

In order to achieve the object defined above, a method of authentication, a method for secure data transmission, an electronic device for performing an authentication, a method of generating session keys for an encrypted communication, a program element, and a computer-readable medium according to the independent claims are provided.

According to an exemplary embodiment an authentication method for a secure data transmission is provided, the method comprising performing a first authentication protocol by applying a first cipher and performing a second authentication protocol by applying a second cipher. Possible inputs for the first authentication protocol may be one shared key or several keys, and one or two random numbers.

According to an exemplary embodiment a method for secure data transmission is provided, wherein the method comprises a method of authentication according to an exemplary embodiment, and transmitting data using the second cipher.

According to an exemplary embodiment a method of generating session keys for an encrypted communication is provided, wherein the method comprises generating a first session key by using a first cipher and generating a second session key based on the first session key by using a second cipher.

According to an exemplary embodiment an electronic device is provided which comprises a processor, wherein the processor is adapted to perform a method according to an exemplary embodiment. In particular, the electronic device may be a security token or a reader device.

According to an exemplary embodiment a communication system is provided which comprises two electronic devices according to an exemplary embodiment. In particular, one electronic device may be a security token while the other one may be a reader device. In particular, the two electronic devices may be adapted to perform an authentication method according to an exemplary embodiment.

According to an exemplary embodiment a program element is provided, which, when being executed by a processor, is adapted to control or carry out a method of authentication according to an exemplary embodiment.

According to an exemplary embodiment a computer-readable medium is provided, in which a computer program is stored which, when being executed by a processor, is adapted to control or carry out a method of authentication according to an exemplary embodiment.

In this application the term "authentication protocol" may particularly denote an abstract or concrete protocol that performs an authentication related function and may also apply cryptographic methods. A protocol may describe how an algorithm should be used. A sufficiently detailed protocol may include details about data structures and representations, at which point it can be used to implement multiple, interoperable versions of a program. Authentication protocols, in particular together with cryptographic protocols, are widely used for secure application-level data transport. In particular, an authentication protocol may be used to assure that the partners of a communication are the intended partners and may end with a generation of a session key.

In this application the term "cipher" may particularly denote an algorithm for performing encryption and decryption, e.g. a series of well-defined steps that can be followed as a procedure. In most cases, that process may be varied depending on a key and/or a random number which changes the detailed operation of the algorithm. Furthermore, in cryptography the original text is known as plaintext and the encrypted form as ciphertext.

In this application the term "key" may particularly denote a piece of information that controls the operation of a cryptography algorithm or cipher. In encryption a key may specify the particular transformation of plaintext into ciphertext, or vice versa during decryption. Keys may also be used in other cryptographic algorithms or ciphers, such as digital signature schemes and keyed-hash functions.

By using two times an authentication protocol, e.g. two times the same protocol or a different one for each time, it may be possible to use two different ciphers, leading to the fact that each of the two ciphers may be tailored to specific needs. For example, the first cipher may be tailored to be a high security cipher, ensuring the security of the communication, while the second cipher may be tailored to be a high performance cipher, possibly enabling a fast communication between partners of a cryptographic communication.

Such a method may be called cascade authentication, since two times an authentication protocol is performed, which may significantly strengthens the security level of the authentication method or mechanism. By using two different tailored ciphers for the performing of the authentication protocol the overall performance may be almost as good as in a medium secure system, i.e. in a system using a medium secure cipher for the authentication and a handshake protocol instead of the second authentication protocol according to the exemplary embodiment, and orders of magnitudes better than in standardized solutions. Furthermore, it may be possible to stick with an existing architecture and infrastructure for the bulk part of the communication between two electronic devices, e.g. a security token and a reader device. Thus, only minor changes may be necessary compared to standardized solutions. In this context the term "handshake protocol" may particularly denote a protocol which may be applied after an "authentication protocol", e.g. after a session key is generated. Such a handshake protocol may involve the exchange of "meaningless" information or data, i.e. data which are not related to the data actually intended to be transmitted and may in particular be used in order to assure that the partners have the same session key.

A gist of an exemplary embodiment may be the replacing of a handshake protocol as a second step of an authentication method by a second classical authentication protocol. That is, two authentication protocols may be used after each other, wherein the second one may replace the common handshake protocol. In particular, the second authentication protocol may ensure that the authentication actually succeeded and that the key agreed upon is indeed known by both partners. Although the partners would notice non-match keys during the secure messaging part of the communication anyway, the use of a dedicated protocol, e.g. an authentication protocol, may ensure that only meaningless messages are exchanged, which may imply that in case the partners do not have the same key no additional starting points for an attack may be exposed.

Next, further exemplary embodiments of the method of authentication are described. However, these embodiments also apply to the method for secure data transmission, the electronic device for performing an authentication, the method of generating session keys for an encrypted communication, the program element, and the computer-readable medium.

According to another exemplary embodiment of the method the first cipher is a high security cipher.

The use of a high security cipher may be a suitable measure to ensure that a communication performed after the authentication may have a high security level. In particular, the high security cipher or high secure cipher may be used at essential points of the communication, e.g. at the beginning, i.e. the authentication step, of the communication, while for the bulk communication another cipher may be used which may be tailored to another need of the communication, e.g. a high performance cipher may optionally be used.

According to another exemplary embodiment the method further comprises outputting a first seed by the first cipher. A possible another output may be a first status indicator, which may be used to indicate whether the first authentication protocol was successfully performed. That is, the first status indicator may form a flag having two states, "failed" and "succeeded". In particular, a first session key may be generated based on the first seed. In case a high security cipher is used as the first cipher, a high security first session key may be generated, i.e. a key having a high entropy which may be used for the secure messaging part of the communication between two electronic devices, like a security token or smart cart and an appropriate reader device. In many cases the first session may be generated by a first key derivation function.

According to another exemplary embodiment of the method an input for the second authentication protocol is the first session key. Possible further inputs for the second authentication protocol may be one shared key or several keys, and one or two random numbers.

According to another exemplary embodiment the method further comprises outputting a second seed by the second cipher. A possible another output may be a second status indicator, which may be used to indicate that the second authentication protocol was successfully performed. That is, the second status indicator may form a flag having two states, "failed" and "succeeded". In particular, a second session key may be generated based on the second seed. In many cases the second session key may be generated by a second key derivation function.

In case a medium or low security cipher is used as the first cipher, a high security first session key may be generated. Thus, a second cipher having a lower security level than the first cipher may be used. Instead the second cipher may be tailored to have a higher performance, i.e. provides a faster data transmission. Although the second session key may have a low entropy and the second cipher may have a low security level the overall security level may not be corrupted since for parts essential for the security the first cipher and the first session key may be used potentially having a high security level and/or entropy. The second cipher may in particular be used for the bulk part of the communication which may mean that the overall performance may only be slightly decreased compared to conventional authentication and communication methods while the security level of a transmission using a authentication method according to an exemplary embodiment may be greatly increased. Since for the bulk part of the communication a high performance cipher may be used the power consumption of the sending electronic device, e.g. a security token, may not heavenly increased as it possibly would in case a high security cipher would be used in the bulk part of the communication or transmission as well.

According to another exemplary embodiment the method further comprises re-performing the first authentication protocol, and re-performing the second authentication protocol. In particular, this embodiment may provide a method of re-authentication.

Such a re-authentication may be in particular suitable in case during a communication in which it is necessary to authenticate several times, e.g. for different sectors of a memory of a security token.

According to another exemplary embodiment of the method the first authentication protocol uses a first key as an input, and in the re-performing the first authentication protocol uses a second key as an input.

According to another exemplary embodiment of the method the first authentication protocol uses a first key and a first random number as an input, and in the re-performing the first authentication protocol uses the first key and a second random number as an input. That is, the same key is used for the first authentication protocol but different random numbers are used which may lead to the fact that a new first session key is generated by the re-performing of the first authentication protocol.

According to another exemplary embodiment of the method the first authentication protocol generates a first session key, and in the re-performing the second authentication protocol uses a second key as an input. In particular, the second key may be a so-called fixed key.

According to another exemplary embodiment of the method the first authentication protocol uses a first random number as an input and generates a first session key, and in the re-performing the second authentication protocol uses the first session key and a second random number as an input. That is, the same key is used for the first authentication protocol but different random numbers are used which may lead to the fact that a new second session key is generated by the re-performing of the second authentication protocol.

Next, further exemplary embodiments of the method for secure data transmission are described. However, these embodiments also apply to the method of authentication, the electronic device for performing an authentication, the method of generating session keys for an encrypted communication, the program element, and the computer-readable medium.

According to another exemplary embodiment of the method in the transmitting of the data a first session key is used which is generated by using the first cipher. Alternatively, in the transmitting of the data a second session key may be used which is generated by using the second cipher.

In general the first session key may have a higher security level and a higher entropy, since the first cipher has a higher security level. A data transmission or secure messaging following the authentication method may use either of the session keys. Primarily the choice may be based on the security level required by the application.

Summarizing, a gist of an exemplary aspect of the present invention may be seen in a combination of a highly performant crypto mechanism with less performant but highly secure crypto primitives, thus leading to a combined authentication procedure keeping the high performance while strengthening the security properties of authentication of secure messaging methods. In particular, the highly secure crypto primitives may be used in parts of the messaging which are essential or crucial for maintaining the security level. For this part standardized strong crypto ciphers, e.g. DES or AES or triple DES, may be used which would have a performance which may not be good enough for a communication, e.g. between a security token and a respective reader device. These strong ciphers usually have a high power consumption which may in particular be higher than a power consumption of medium or low secure ciphers. For the bulk part a cipher, e.g. a block cipher or a stream cipher, having a rather short key and consequently a lower security level but having a higher performance, may be used. This combination of two ciphers may lead to the fact that the security level of the communication is substantially maintained, i.e. similar to a communication based on a highly security cipher, while the power consumption and the performance of the communication is substantially maintained, i.e. similar to a communication based on a medium or low security cipher having a high performance. Thus, although a rather short key may be used for the bulk part of the communication, the communication is not easily cracked or broken and the security of the whole system may not be compromised easily, since for the crucial messaging parts the high security cipher/key may be used.

Thus, a cascade authentication may be formed which may increase significantly the security level of the authentication mechanism compared to similar performing standard authentication methods using an authentication protocol and a handshake protocol. The cascade authentication method or mechanism may comprise at least three cryptographic protocols.

1. A first mutual authentication protocol with a strong first crypto cipher, preferably standarized.

2. A second mutual authentication protocol, as a replacement for a common handshake protocol, using a second crypto cipher that may be proprietary. In many cases the second crypto cipher is not as strong or secure as the first one but is of high performance.

3. Secure messaging using the second high performance crypto cipher or crypto algorithm with a session key generated either by the first mutual authentication protocol or by the second mutual authentication protocol.

A basic idea of the exemplary aspect may be that a double authentication with two different underlying ciphers may be functionally substantially the same as one authentication and a subsequent handshake protocol, i.e. the second authentication may replace the original handshake protocol. Since the handshake protocol may have almost the same functional requirements and properties as an authentication protocol, i.e. only random numbers may be exchanged as messages and the goal of the protocol is an assurance of the knowledge state of the communication partners, even a quite weak cipher may be used for the replacing the handshake protocol as long as the cipher does not allow for an easy key recovery attack.

An authentication method according to an exemplary embodiment may be used in the field of contactless chips, e.g. in so-called Milfare application systems.

The aspects and exemplary embodiments defined above and further aspects of the invention are apparent from the example of embodiment to be described hereinafter and are explained with reference to these examples of embodiment.

BRIEF DESCRIPTION OF THE DRAWINGS

The invention will be described in more detail hereinafter with reference to examples of embodiment but to which the invention is not limited.

DESCRIPTION OF EMBODIMENTS

Figure 1:
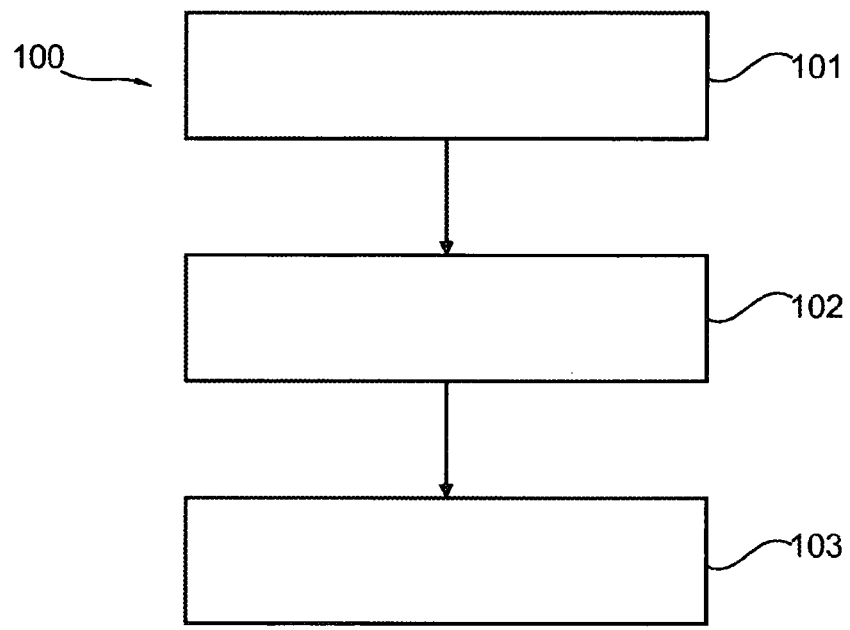
FIG. 1 schematically illustrates a cascade authentication mechanism according to an exemplary embodiment.

The illustration in the drawing is schematically. In different drawings, similar or identical elements are provided with similar or identical reference signs.

In the following an authentication mechanism or authentication method 100 for a communication between two electronic devices, e.g. a security token and a respective reader device, according to an exemplary embodiment will described in more detail with reference to the FIGS. 1 to 3.

FIG. 1 schematically illustrates a cascade authentication method or mechanism for a communication. In general the authentication mechanism 100 comprises a first mutual authentication protocol 101 using a highly secure cipher. This first mutual authentication protocol may be a classical authentication step using a strong standardized cipher like the Data Encryption Standard algorithm (DES) or the Advanced Encryption Standard algorithm (AES). Further, the authentication mechanism 100 comprises a second authentication protocol 102 using a high performance cipher. This second authentication protocol 102 may be a re-used authentication protocol as commonly known with a medium or low security cipher. Furthermore, the authentication mechanism 100 comprises a secure messaging 103 using a high performance cipher. The combination of the above described three parts of the authentication mechanism 100 may allow for several optional configurations that may be used to tailor the protocols to the communication or application with respect to performance, security and implementation.

Figure 2:
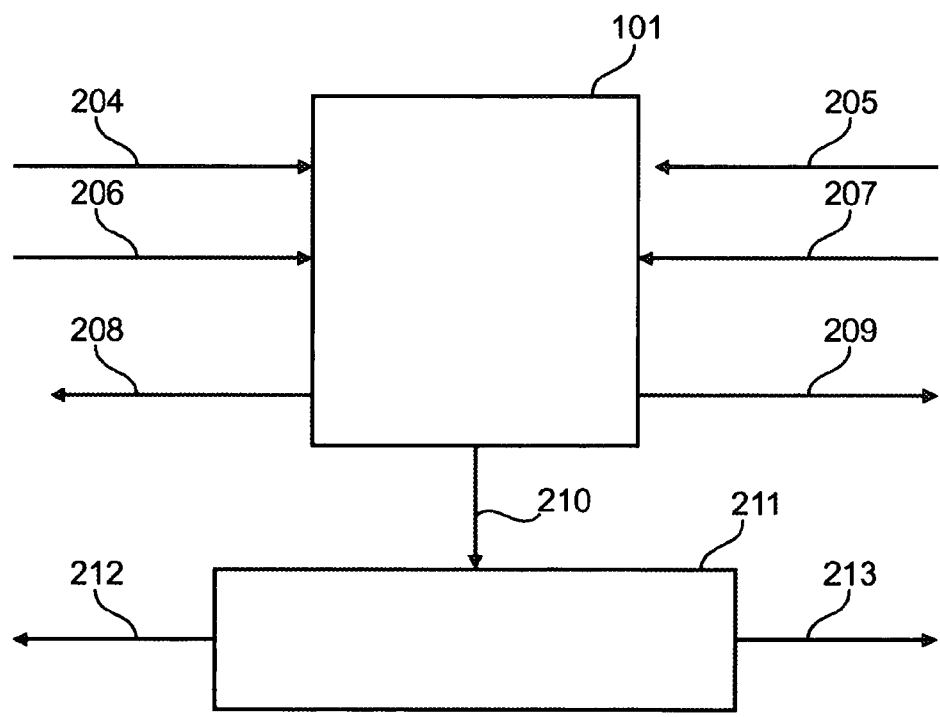
FIG. 2 schematically illustrates a first detail of the cascade authentication mechanism of FIG. 1.

FIG. 2 schematically illustrates a first detail of the cascade authentication mechanism 100 of FIG. 1, i.e. the first mutual authentication protocol 101 using a high security cipher. The first mutual authentication protocol 101 performs the authentication according to a distributed algorithm or first cipher using values of four parameters as input. In particular, both of the electronic devices involved in the communication, e.g. the security token and the reader device, use two input parameters each. One of these parameters is a shared key and the other one is a random number recently and uniquely chosen for authentication purposes only. The four input parameters for the authentication algorithm/cipher are schematically depicted in FIG. 2 by the four arrows 204 and 205 for the shared key and 206 for the first random number and 207 for the second random number. An output of the first authentication algorithm or cipher is twofold. A first output is a status indicator which is distributed to both the security token and the reader device, wherein in FIG. 2 the distribution is schematically indicated by the arrows 208 and 209. The status indicator indicates whether the mutual authentication has been successful. A further output is a seed 210 for a first key derivation function 211 that derives a first session key from the values of the four input parameters, usually the random number, used in the authentication algorithm. The first session key is then distributed to the two devices which is schematically depicted in FIG. 2 by the arrows 212 and 213.

Figure 3:
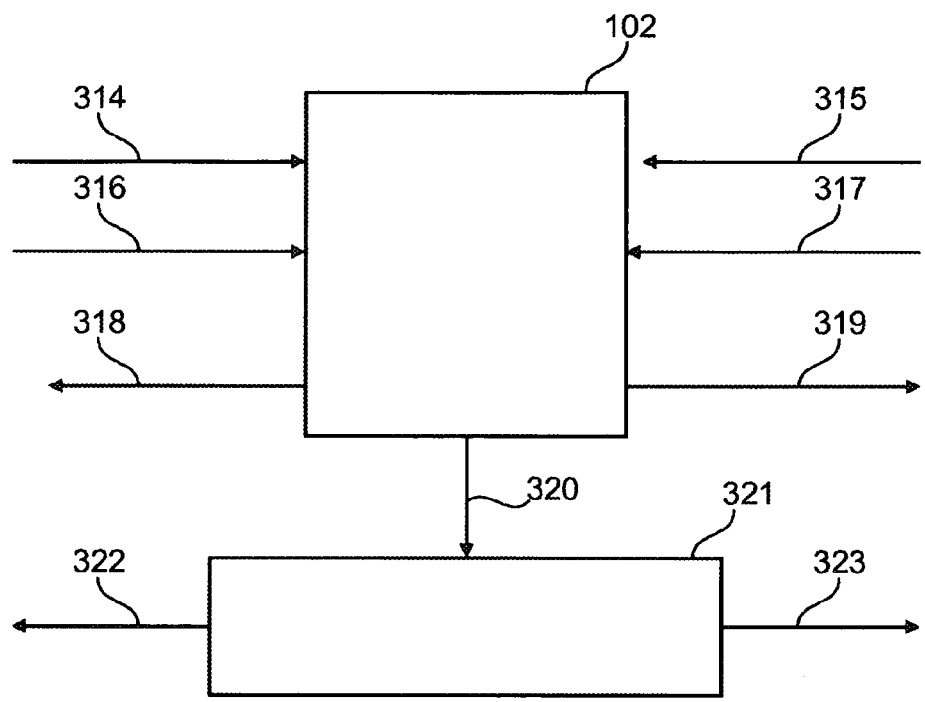
FIG. 3 schematically illustrates a second detail of the cascade authentication mechanism of FIG. 1.

FIG. 3 schematically illustrates a second detail of the cascade authentication mechanism of FIG. 1, i.e. the second authentication protocol 102 using a second high performance cipher. In particular, a common authentication protocol may be applied using a medium or low security but high performance cipher. However, the second cipher is secure enough for the second part of the authentication, which replaces the handshake protocol as known in common authentication procedures, since the security requirements for a handshake protocol are lower. In case a common authentication protocol is used instead of a common handshake protocol the input parameters of the used second cipher are again a common shared key 314 and 315 used for each of the devices, which may be formed by the first session key derived by the first key derivation function 211. Optionally, an additional shared key may be used as an additional input parameter. In this case two keys are used for the second cipher, which is not necessary from a security point of view, but may lead to a situation that the overall system architecture needs less changes compared to common authentication protocols.

Furthermore, in case a common authentication protocol is used for the second authentication protocol 102 the second cipher needs as well two random number as input. This input is also schematically shown in FIG. 3 by the arrows 316 and 317. These two random numbers are as well not necessary for the security, which make them optional for the second authentication protocol and the respective second cipher, however keeping them in the protocol might again lead to fewer changes in the overall system architecture. The second cipher also outputs a status indicator giving the result "succeeded" or "failed" which is then distributed to the security token and the reader device, wherein the distribution is again indicated by the arrows 318 and 319 in FIG. 3. Another output is a second seed 320 which can be used in a second key derivation function 321 to derive a second session key. The second session key may then be distributed to the security token and the reader device which is again indicated in FIG. 3 by the arrows 322 and 323.

Figure 4:
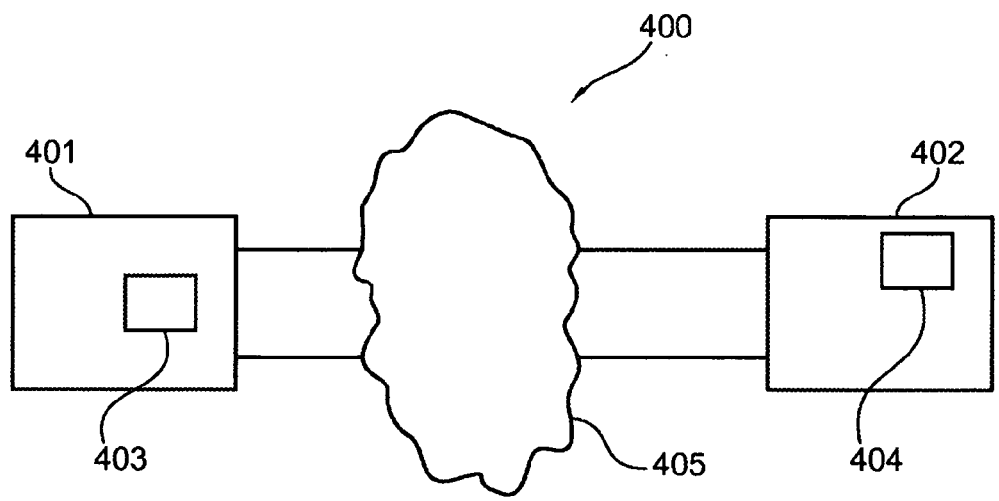
FIG. 4 schematically illustrates a system for applying the cascade authentication mechanism.

FIG. 4 schematically illustrates a system 400 for applying the cascade authentication mechanism. The system 400 comprises a first electronic device 401, e.g. a security token or a smart card, and a second electronic device 402, e.g. a reader device. Each of the two electronic devices comprises a processing unit 403 and 404, respectively, wherein the processing units are adapted to carry an authentication method according to an exemplary embodiment. The two electronic devices may communicate with each other via a communication media 405 in several ways, e.g. in a contacless mode (by radio, infrared, optical etc.) or in a wired mode, i.e. the two electronic devices may be connected to each other by a connection line.

It should be noted that the first session key may in general have a higher security level and a higher entropy since the first cipher is in general a high security cipher. The secure messaging 103 may use either of the session keys. The choice which one is used may be based on the security level required by the application.

Finally, it should be noted that the above-mentioned embodiments illustrate rather then limit the invention, and that those skilled in the art will be capable of designing many alternative embodiments without departing from the scope of the invention as defined by the appended claims. In the claims, any reference signs placed in parentheses shall not be construed as limiting the claims. The word "comprising" and "comprises", and the like, does not exclude the presence of elements or steps other than those listed in any claim or the specification as a whole. The singular reference of an element does not exclude the plural reference of such elements and vice-versa. In a device claim enumerating several means, several of these means may be embodied by one and the same item of software or hardware. The mere fact that certain measures are recited in mutually different dependent claims does not indicate that a combination of these measures cannot be used to advantage.

The invention claimed is:

1. An authentication method for a secure data transmission, the method comprising:
    performing, in a processor, a first authentication protocol by using a first cipher, and
    performing, in the processor, a second authentication protocol by using a second cipher, wherein the second authentication protocol replaces a handshake protocol.

2. The method according to claim 1, further comprising:
    outputting a first seed by the first cipher.

3. The method according to claim 2, further comprising:
    generating a first session key based on the first seed.

4. The method according to claim 3, wherein an input for the second, authentication protocol is the generated first session key.

5. The method according to claim 1, further comprising:
    outputting a second seed by the second cipher.

6. The method according to claim 5, further comprising:
    generating a second session key based on the second seed.

7. The method according to claim 1, further comprising:
reperforming the first authentication protocol; and
reperforming the second authentication protocol.

8. The method according to claim 7, wherein the first authentication protocol uses a first key as an input, and wherein the reperforming of the first authentication protocol uses a second key as an input.

9. The method according to claim 7, wherein the first authentication protocol uses a first key and a first random number as inputs, and wherein the reperforming of the first authentication protocol uses the first key and a second random number as inputs.

10. The method according to claim 7, wherein the first authentication protocol generates a first key, and wherein the reperforming of the second authentication protocol uses a second key as an input.

11. The method according to claim 7, wherein the first authentication protocol uses a first random number as an input and generates a first session key and wherein the reperforming of the second authentication protocol uses the first session key and a second random number as inputs.

12. The method of authentication according to claim 1, further comprising:
transmitting data using the second cipher.

13. The method according to claim 12, further comprising:
generating a first session key by using the first cipher.

14. The method according to claim 12, further comprising:
generating a second session key by using the second cipher.

15. A method of generating session keys for an encrypted communication, the method comprising:
generating, in a processor, a first session key by using a first cipher; and
generating, in a processor, a second session key based on the first session key by using a second cipher, wherein the second session key is used in a second authentication protocol that replaces a handshake protocol.

16. The method of claim 1, wherein the processor is implemented in an electronic device that is either a security token or a reader device.

17. A non-transitory medium, in which a computer program is stored which, when being executed by a processor, is configured to perform the method of claim 1.

* * * * *